United States Patent
Kerschbaum et al.

(10) Patent No.: US 11,622,015 B2
(45) Date of Patent: Apr. 4, 2023

(54) METHOD FOR CONFIGURING AN OPC UA PUBSUB SUBSCRIBER, AUTOMATION SYSTEM, COMPUTER PROGRAM AND COMPUTER-READABLE MEDIUM

(71) Applicant: Siemens Aktiengesellschaft, Munich (DE)

(72) Inventors: Sven Kerschbaum, Fürth (DE); Stephan Home, Schwabach (DE); Frank Volkmann, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/765,631

(22) PCT Filed: Aug. 20, 2020

(86) PCT No.: PCT/EP2020/073349
§ 371 (c)(1),
(2) Date: Mar. 31, 2022

(87) PCT Pub. No.: WO2021/063596
PCT Pub. Date: Apr. 8, 2021

(65) Prior Publication Data
US 2022/0353342 A1 Nov. 3, 2022

(30) Foreign Application Priority Data
Oct. 1, 2019 (EP) .................................. 19200672

(51) Int. Cl.
*H04L 67/00* (2022.01)
*H04L 67/55* (2022.01)

(52) U.S. Cl.
CPC .............. *H04L 67/34* (2013.01); *H04L 67/55* (2022.05)

(58) Field of Classification Search
CPC ................................. H04L 67/34; H04L 67/55
See application file for complete search history.

(56) References Cited

U.S. PATENT DOCUMENTS

| 10,892,938 | B1 * | 1/2021 | Brissette | H04L 67/51 |
| 11,310,203 | B2 * | 4/2022 | Wittier | H04L 63/0236 |

(Continued)

FOREIGN PATENT DOCUMENTS

CN        107454092        12/2017

OTHER PUBLICATIONS

PCT International Search Report dated Nov. 13, 2020 based on PCT/EP2020/073349 filed Aug. 20, 2020.

(Continued)

*Primary Examiner* — Blake J Rubin
(74) *Attorney, Agent, or Firm* — Cozen O'Connor

(57) ABSTRACT

A method for configuring at least one OPC UA PubSub subscriber in an in particular industrial network, in which a) a virtual address space is provided for the at least one subscriber on a configuration module that is separate from the at least one subscriber, b) a configuration for the at least one subscriber is performed and/or a configuration already existing for the at least one subscriber is changed in the virtual address space of the at least one subscriber, c) the configuration module converts the configuration and/or configuration change into at least one PubSub message, d) the at least one PubSub message is transmitted to the at least one subscriber, and e) the at least one subscriber is configured according to the at least one PubSub message. In addition, the invention relates to an automation system, a computer program and a computer-readable medium.

15 Claims, 3 Drawing Sheets

(56) References Cited

U.S. PATENT DOCUMENTS

| | | | |
|---|---|---|---|
| 11,323,519 B2* | 5/2022 | Sherman | H04L 67/51 |
| 11,463,256 B2* | 10/2022 | Clark | G06F 16/182 |
| 2018/0024537 A1* | 1/2018 | Chauvet | G06F 9/50 |
| | | | 718/104 |
| 2018/0026942 A1* | 1/2018 | De Ligt | H04L 61/35 |
| | | | 709/245 |
| 2018/0107230 A1* | 4/2018 | Sai | H04L 67/125 |
| 2018/0262592 A1 | 9/2018 | Zandi et al. | |
| 2018/0309831 A1* | 10/2018 | Sherman | H04L 67/125 |
| 2019/0297160 A1* | 9/2019 | Harriman | G06F 9/4856 |
| 2020/0099252 A1* | 3/2020 | Cintuglu | G01R 19/2513 |
| 2020/0257700 A1* | 8/2020 | Xu | G06F 8/65 |
| 2020/0280615 A1* | 9/2020 | Andersson | H04L 67/5682 |
| 2020/0366513 A1* | 11/2020 | Yoneda | H04L 67/62 |
| 2020/0387145 A1* | 12/2020 | Nixon | G05B 19/41835 |
| 2020/0409340 A1* | 12/2020 | Hampikian | H04L 67/104 |
| 2021/0029029 A1* | 1/2021 | Mehmedagic | H04L 41/40 |
| 2022/0086243 A1* | 3/2022 | Pang | H04L 67/51 |
| 2022/0147021 A1* | 5/2022 | Nagata | G05B 19/056 |

OTHER PUBLICATIONS

OPC Foundation "OPC Unified Architecture Specification Part 14: PubSub Release 1.04", Feb. 6, 2018.

Burger, Andreas et al. "Automatisierte Inbetriebnahme von Industriellen IoT—Systemen in der Prozessautomatisierung: Eine Referenzarchitektur"; Automatisierungstechnik-AT., Bd. 67, Nr. 3, pp. 172-182, Mar. 26, 2019.

"Industrie 4.0—Industrielle Kommunikation—Basistechnologie für die Digitalisierung der Industrie" von Markus Weinländer, VDE Verlag, 2017.

Ademaj, Astrit; "PTCC—TSN Endstation Centralized Configuration Interface for OPC UA PubSub Systems", IEEE Draft; 60802-ADEMAJ-PTCC-0918-V05; IEEE-SA; Piscataway; NJ USA; Bd. 802.1, Nr. v05 , pp. 1-24, Sep. 18, 2019.

* cited by examiner

METHOD FOR CONFIGURING AN OPC UA PUBSUB SUBSCRIBER, AUTOMATION SYSTEM, COMPUTER PROGRAM AND COMPUTER-READABLE MEDIUM

CROSS-REFERENCE TO RELATED APPLICATIONS

This is a U.S. national stage of application No. PCT/EP2020/073349 filed 20 Aug. 2020. Priority is claimed on European Application No. 19200672.4 filed 1 Oct. 2019, the content of which is incorporated herein by reference in its entirety.

BACKGROUND OF THE INVENTION

1. Field of the Invention

The invention relates to an automation system, a computer program, a computer-readable medium a method for configuring at least one Open Platform Communications Unified Architecture (OPC UA) Publish/Subscribe (PubSub) subscriber within an industrial network.

2. Description of the Related Art

OPC UA (OPC Unified Architecture) is an industrial standard protocol of the OPC Foundation for manufacturer-independent communication for interchanging machine data in particular in process and production automation.

The OPC Foundation has published a multipart specification relating to OPC Unified Architecture.

OPC UA is also dealt with in chapter 4 of the book "Industrie 4.0—Industrielle Kommunikation—Basistechnologie für die Digitalisierung der Industrie" by Markus Weinländer, published by the DIN Institut für Normung e.V., 2017, VDE Verlag, ISBN 978-3-8007-4262-2 (VDE Verlag).

OPC UA PubSub (Publish/Subscribe) is an extension of the client/server-based approach of OPC UA hitherto. The PubSub extension is explained more thoroughly in part 14 of the specification (OPC Foundation: OPC Unified Architecture, Part 14: PubSub, Release 1.04, Feb. 6, 2018).

Standard Part 14 extends the request/response method that has existed up until this time by a publish-subscribe communication mechanism. The publish/subscribe approach involves a publisher sending its data to a network and all subscribers being able to receive these data (one-to-many). Furthermore, since November 2018, work has been performed at the OPC UA Foundation on a possible use of OPC UA PubSub at field level (OPC UA FLC) (see the article "Major Automation Industry Players join OPC UA including TSN initiative" and the article "New Initiative: Field Level Communications: OPC Foundation extends OPC UA including TSN down to field level" at). In this case, it is the applicant's view that OPC UA PubSub is in particular suitable for the machine-to-machine communication, while the process data interchange between the IO devices and the controller can preferably occur in the previous manner using Profinet/Profinet TSN. OPC UA PubSub is therefore a suitable addition to the fieldbus Profinet (TSN).

Chapter 6 of the standard (Part 14) cites and explains the communication parameters of PubSub. Part 14 of the standard also describes the possible transport protocol mappings (UDP, Ethernet, AMQP, MQTT) and message mappings (UADP, JSON). Chapter 9 describes the PubSub configuration model.

"PTCC-TSN Endstation Centralized Configuration Interface for OPC UA PubSub Systems", IEEE DRAFT, 60802-ADEMAJ-PTCC-0918-V05, IEEE-SA, PISCATAWAY, N.J., USA discloses a conventional method.

US 2018/262592 A1 describes a method for configuring a subscriber in which a virtual address space is provided for the subscriber on a configuration module that is separate from the subscriber. A configuration for the subscriber is performed in the virtual address space via method calls. The configuration is converted by the configuration module into a message that is transmitted to the subscriber. The subscriber is then configured according to this message.

The configuration of OPC UA PubSub communication subscribers can occur in two ways today according to the standard (Part 14).

First, via a configuration file (a "binary file"), the format of which is specified in the standard. However, the standard does not specify how the configuration file is made available to the respective device needing to be configured as an OPC UA PubSub communication subscriber. This must therefore be performed using a proprietary method. Subscribers/devices that support this type of configuration therefore require special manufacturer-dependent tools and may then (based on the configuration) sometimes not be interoperable with devices from other manufacturers. This configuration approach is therefore problematic, in particular in view of OPC UA FLC.

A second option is to resort to method calls in the OPC UA server of the subscriber needing to be configured. For this, the configuration tool then connects to the OPC UA server of the device/subscriber needing to be configured and performs the appropriate method calls, e.g., to create DataSetWriterGroups and DataSetWriters (publishers) or DataSetReaderGroups and DataSetReaders (subscribers) and to produce the DataSets (cf., for example, the Utthunga OPC UA PubSub configuration tool, which is available through the OPC UA Foundation). This requires the subscriber needing to be configured to support not only the PubSub component but also the existing request/response method, including the OPC UA server and address space, i.e., to have an OPC UA server and address space. The existing request/response method is based on TCP/IP. As a result, the subscriber/device must therefore also support TCP in its network stack. This and the resources required for the OPC UA server and the request/response protocol (OPC UA client/server, including OPC UA SecureChannel) lead to the existence of a high resource requirement, particularly with respect to flash and RAM. TCP connections likewise need to be managed by the stack and are therefore distinctly "more expensive" than the use of the connectionless UDP.

This is inconsistent with the requirement for in particular IO devices in the industrial setting to be "small" (in the sense of available hardware (HW) resources, e.g. flash and RAM) and "cheap". The more HW resources are required, the more expensive a device usually becomes.

SUMMARY OF THE INVENTION

In view of the foregoing, it is therefore an object of the present invention to provide a way of configuring devices as OPC UA PubSub subscribers that entails a reduced resource requirement for the devices as compared with the prior art.

This and other objects and advantages are achieved in accordance with the invention by a method for configuring at least one OPC UA PubSub subscriber in an in particular industrial network, where a) a virtual OPC UA PubSub address space is provided for the at least one subscriber on a configuration module that is separate from the at least one subscriber, b) a configuration for the at least one subscriber is performed in the virtual address space via method calls and/or a configuration that already exists for the at least one subscriber is changed, c) the configuration module converts the configuration and/or configuration change into at least one PubSub message, d) the at least one PubSub message is transmitted to the at least one subscriber, and e) the at least one subscriber is configured according to the at least one PubSub message.

In accordance with the invention, the configuration module receives the identification thereof and the present configuration thereof as a PubSub message from the at least one subscriber and, in reaction thereto, provides the virtual address space for the at least one subscriber in step a). Moreover, the configuration module joins a first publishing group, for which it is the publisher and to which the at least one subscriber subscribes. Additionally, the configuration module joins a second publishing group, in which it participates as a subscriber. Furthermore, the configuration module announces the second publishing group in the first publishing group, and the at least one subscriber subscribes to the second publishing group. In addition, the at least one subscriber sends its identification and its present configuration to the second publishing group as a PubSub message.

It is also an object of the invention to provide an automation system for performing the method according to the invention. The automation system in accordance with the invention preferably comprises at least one field device that forms the at least one subscriber and a configuration module that is separate from the at least one field device, where a virtual address space is provided or providable for the at least one field device in the configuration module, and the configuration module is configured and/or set up such that, if a configuration for the at least one field device is performed for the at least one field device in the or a virtual address space and/or a configuration that exists for the at least one field device is changed, then it converts the configuration and/or configuration change into at least one PubSub message and transmits the at least one PubSub message to the at least one field device, and the at least one field device is configured and/or set up to configure itself according to the at least one PubSub message.

In other words, the basic concept of the present invention is that the address space of the or, in the case of multiple, the respective subscriber is "relocated", in other words virtualized, from the, or the respective, subscriber to an in particular central instance in the network. The address space(s) are then no longer available on the subscribers themselves but rather virtually in the in particular central instance in the network, specifically the configuration module, and a user can perform the configuration in the virtual address space(s) of the individual subscriber(s) as usual, in particular via method calls.

If a configuration of a subscriber is changed by a user in the virtual address space in the configuration module, then the configuration module communicates this to the subscriber, in accordance with the invention, via PubSub and the, or the respective, subscriber takes on the new/changed configuration. In practice, the configuration module is a central manager, in particular a configuration manager for the subscriber(s). The configuration module may be implemented by software or hardware or by a combination of software and hardware.

With the invention, it is no longer absolutely essential for the subscriber(s) to have an OPC UA address space and to support OPC UA client/server functionality. As a result, it is also possible to dispense with the use of TCP in the network stack of the subscribers, because OPC UA PubSub is, or can be, transmitted, e.g., via User Datagram Protocol (UDP), Ethernet, Time-Sensitive Networking (TSN) or, in future, 5G. The resource requirement (for example, flash and RAM) of the subscriber(s) can be significantly reduced as a result.

The subscriber(s), which may in particular be IO devices, and which are normally present in significantly higher numbers compared to the single central configuration module, can therefore become significantly less expensive. In addition, maintenance expenditure is also reduced and a smaller security attack area is achieved. There is, among other things, less expenditure as a result of firmware updates. Another great advantage is that the respective subscriber(s) does not need to be available/online at the time of the configuration by the user, since the configuration module, which is separate therefrom, stores the configuration in the associated virtual address space and the configuration can be communicated to the subscriber when it next "appears". Finally, the procedure in accordance with the invention is totally transparent from the point of view of the user, i.e., no difference arises for the user during configuration compared to the previous, known procedure.

A virtual, or virtualized, address space is in particular intended to be understood to mean an address space that is not at, or on, the or, in the case of multiple, the respective subscriber, in particular not on the hardware of the, or the respective, subscriber, but rather is implemented separately from the, or the respective, subscriber, in particular on hardware that is separate from the hardware of the, or the respective, subscriber. The virtual address space(s) are on or in the configuration module.

The configuration that is performed or changed is expediently an OPC UA PubSub configuration, preferably one as defined by the standard OPC Unified Architecture, Part 14: PubSub. The configuration, or configuration change, preferably relates to at least one of the configuration parameters cited in chapter 6 of this standard.

The virtual address space(s) provided for the, or the respective, subscriber on the configuration module are expediently one or more OPC UA address spaces, in particular as defined by the aforementioned standard OPC Unified Architecture, Part 14: PubSub. They may be in particular (in each case) an address space as depicted in FIG. 36 of the standard. The OPC UA information model for the PubSub configuration in chapter 9 of this standard specifies the objects used in an OPC UA address space to produce, or change, an OPC UA PubSub configuration. That a configuration is performed, or changed, in the virtual name space provided on the configuration module means in particular that at least one of the configuration parameters cited in chapter 6 of the standard OPC Unified Architecture, Part 14: PubSub is stored, or changed, in the virtual address space.

The virtual address space(s) provided for the, or the respective, subscriber on the configuration module are in particular an information model for the, or the respective, subscriber. They are in particular an information model that relates to the PubSub communication and the variable budget of the, or the respective, subscriber. By way of example, the (respective) virtual address space/the applicable information model can also comprise the information regarding which variables are part of the PublishedDataSet of the (respective) subscriber, and/or the mapping from the DataSetItems of a SubscribedDataSet to the variables in the variable budget. The virtual address space(s) provided for the subscriber(s) can accordingly also be regarded, or referred to, as virtual information address spaces, in particular virtual OP UA information address spaces.

In a further advantageous configuration, it is the case that the virtual address space of the, or the respective, subscriber is provided in an address space of the configuration module. In other words, the configuration module then has an address space of its own within which the virtual address space(s) for the subscriber(s) is (are) located. Particularly preferably, it is the case for the, or the respective, virtual address space that it (they) is (are) "shown" in an address space of the configuration module.

A PubSub message is preferably intended to be understood to mean a message as described in the cited Standard Part 14, in chapter 5.3 (see also FIG. 4 in this chapter).

In a further particularly preferred embodiment, it is the case that in step b) the configuration in the virtual address space of the at least one subscriber is performed and/or changed via method calls. This can be performed by a user, who can use previously known means for this purpose, for example, the Utthunga PubSub configuration tool. It should be noted that, as an alternative or in addition to the Utthunga PubSub configuration tool, any other tool that can be used to perform configurations in particular via method calls, preferably method calls as defined by the standard OPC Unified Architecture, Part 14: PubSub (see, e.g., page 114, FIG. 40, and table 112), can also be used. In a further embodiment, the automation system in accordance with the invention is configured and/or set up accordingly.

It has been found to be quite particularly suitable if the configuration module is afforded by an OPC UA Global Discovery Server (OPC UA GDS) or is formed as part of such. Particularly preferably, the configuration module is afforded by an OPC UA Global Discovery Server according to UA Specification Part 12 (Discovery and Global Services) or forms part of such. The OPC UA Global Discovery Server is then expediently extended by a publisher and subscriber functionality and a server address space of its own.

In a preferred embodiment, the configuration module receives the identification thereof and the present configuration thereof from the at least one subscriber, preferably by virtue of the at least one subscriber sending the identification and present configuration as DataSet metadata. The configuration module then knows the at least one subscriber and knows how it needs to be addressed.

The configuration module can then provide, or configure, the virtual address space for the, or the respective, subscriber in step a) in particular in reaction thereto.

The configuration module can take the received identification/configuration messages as a basis for setting up its information model in the address space to represent the subscriber(s) there as appropriate.

The configuration module preferably communicates with the subscriber(s) exclusively via the first publishing group. The configuration module does this in particular by sending commands in the form of events to this publishing group.

Accordingly, in a further advantageous embodiment, it is the case that the configuration module sends the at least one PubSub message into which it has converted the configuration and/or configuration change to the first publishing group in step d).

The PubSub message into which the configuration module converts the configuration and/or configuration change in step d) preferably also comprises an addressing of the at least one subscriber.

In step c), the configuration module converts the configuration and/or configuration change in particular into at least one PubSub Event message. As such, an event-based transmission can be produced as compared with the usually cyclic sending for PubSub.

Receipt of the at least one PubSub message transmitted in step d) is expediently acknowledged by the at least one subscriber. The acknowledgement can be provided by virtue of the at least one subscriber publishing the configuration performed in step d) in the second publishing group.

The at least one subscriber being configured according to the at least one PubSub message in step e) can, for example, simply occur as a result of, or comprise, the subscriber storing the received PubSub message, or at least portions thereof. This holds in particular if the message comprises the configuration, for example as a binary file.

The subscriber(s) may be part of an industrial automation system.

The subscriber or at least one of the subscribers is particularly preferably a field device, in particular IO device. Accordingly, the field device, or at least one of the field devices, of the system in accordance with the invention is afforded by an IO device. It should also be understood that one or more subscribers configured using the method in accordance with disclosed embodiments of the invention are afforded by another type of automation component, such as an Human Machine Interface (HMI) panel and/or in particular a programmable logic controller.

The devices, or components, of the automation system in accordance with the invention are preferably connected, or connectable, via a network, as is already sufficiently well-known from the prior art. The configuration module may be implemented, for example, on a computing device that is separate from the field devices, for example, an industrial PC, and/or on the Edge and/or in a cloud, these being connected or connectable to the field devices via a network.

It is a further object of the present invention to provide a computer program comprising program code instructions which, when the program is executed by a processor of at least one computer, cause the at least one computer to perform the steps of the method in accordance with the disclosed embodiments of the invention.

It is a further object of the invention to provide a computer-readable medium comprising program code instructions which, when executed by a processor of at least one computer, cause the at least one computer to perform the steps of the method in accordance with disclosed embodiments of the invention.

The computer-readable medium may be for example a CD-ROM or DVD or a USB or flash memory. It should be noted that a computer-readable medium is not exclusively intended to be understood to mean a physical medium, but rather may, for example, also be present in the form of a data stream and/or a signal that represents a data stream.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention will become clear from the description that follows of embodiments according to the invention with reference to the accompanying drawing, in which.

DETAILED DESCRIPTION OF THE EXEMPLARY EMBODIMENTS

Figure 1:
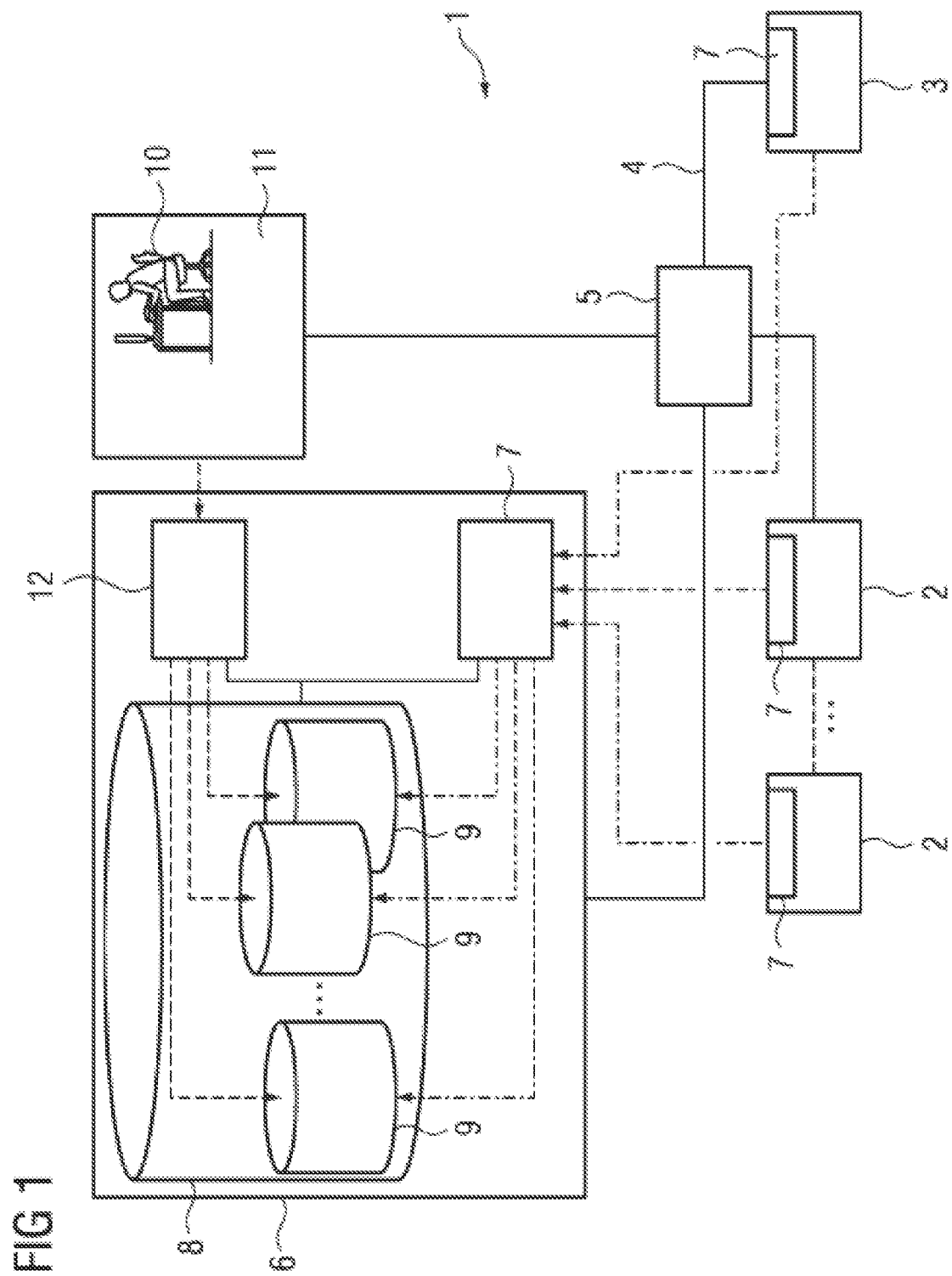
FIG. 1 shows a purely schematic representation of an exemplary embodiment of an automation system in accordance with the invention.

FIG. 1 shows an exemplary embodiment of an automation system in accordance with the invention in a highly simplified, purely schematic representation.

Figure 2:
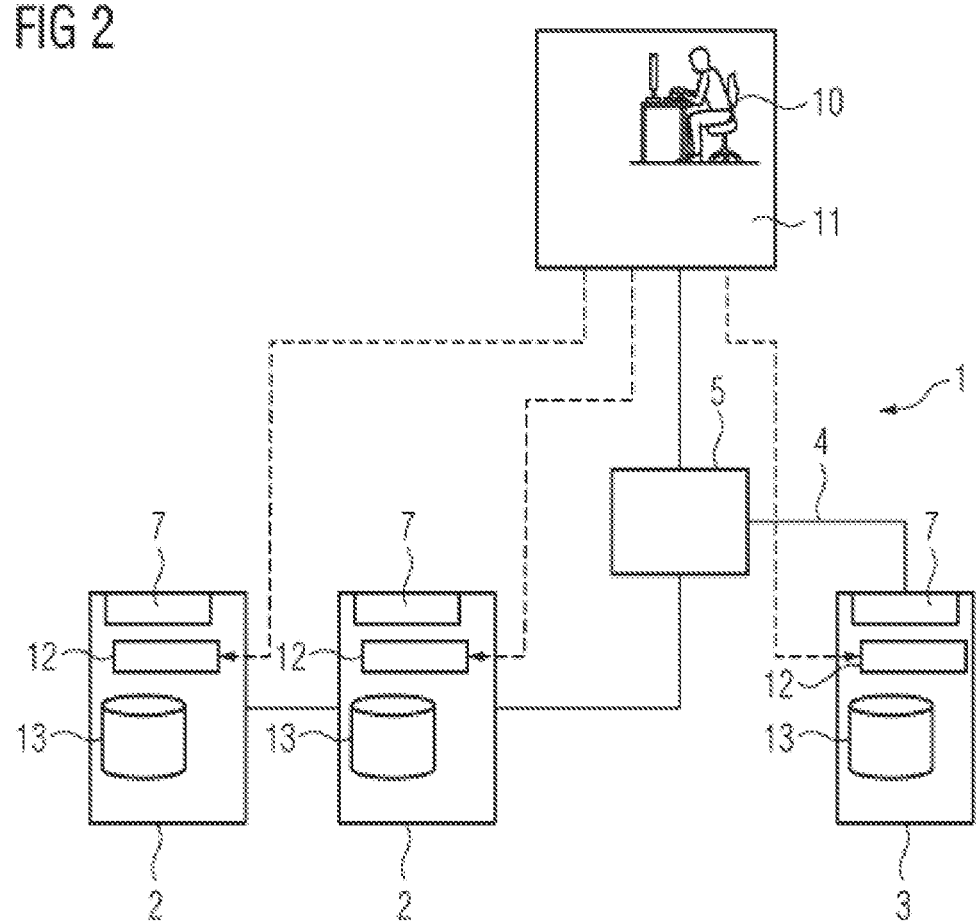
FIG. 2 shows an automation system in accordance with the prior art.

The illustrated automation system comprises a plurality of components, inter alia, multiple field devices, at least some of which are afforded by IO devices, and programmable logic controllers. Of the multiplicity of components, FIG. 2 shows two IO devices 2 and one programmable logic controller 3 by way of illustration. The " . . . " between the two IO devices 2 is used to indicate that more IO devices 2 may of course be, or are, present. The controller 3 and IO devices 2 are used, as is already sufficiently well-known from the prior art, to monitor and control a technical process, which is not depicted further. It should be understood it is also possible, as is likewise already known per se, for there to be provision for more than one controller 3 and/or other components, for example, HMI panels and/or the like.

The components of the automation system 1 are connected to one another via a network 4 for the purpose of data interchange. The network 4 comprises multiple switches 5, one of which is shown by way of illustration in FIG. 1.

The automation system 1 further comprises a configuration module 6 that, in the case of the exemplary illustrated embodiment, is afforded by an OPC UA Global Discovery Server (OPC UA GDS), which is implemented on a computer, in the present case an industrial PC, which is separate from the further components of the system 1 and likewise participates in the network 4. The OPC UA Global Discovery Server is extended by a publisher and subscriber functionality, which is implemented on a software basis by an appropriate functional unit 7, and a server address space 8 of its own.

The IO devices 2 and the controller 3 also comprise a functional unit 7 of this kind via which the PubSub function is implemented thereon. The functional units 7 of the IO devices 2 are likewise software-implemented in the present case.

The configuration module 6 serves as central manager, which is used for the OPC UA PubSub communication configuration of the IO devices 2 and, in the case of the example shown, also for the controller 3.

The configuration is effected by performing the exemplary embodiment of the method in accordance with the invention as described below.

In a first step, the configuration module 6 initially joins a first publishing group, for which it is the publisher. The group is subscribed to by the IO devices 2 that form subscribers and by the controller 3.

The configuration module 6 can be disclosed, or may previously have been disclosed, to the subscriber(s) 2, 3, for example, by using a well-known multicast group.

The configuration module 6 then also joins a second publishing group, in which it participates as a subscriber.

Next, the configuration module 6 announces the second publishing group, to which the IO devices 2 and the controller 3 subscribe, in the first publishing group. As a result, the configuration module 6 announces itself as responsible for the IO devices 2 and the controller 3.

The configuration module 6 communicates with the IO devices 2, or the controller 3, exclusively via the first publishing group. The configuration module 6 does this in particular by sending commands in the form of events to this publishing group.

The configuration module 6 receives from the respective IO device 2 and the controller 3 in each case the identification thereof and the present configuration thereof by virtue of the respective IO device 2, or the controller 3, sending the identification and present configuration to the second publishing group as a PubSub message, in the present case as DataSet metadata. The configuration module 6 then knows the respective subscriber 2, 3 and knows how it needs to be addressed.

The configuration module 6 then provides a virtual address space 9 within its server address space 8 for every subscriber 2, 3 whose identification and present configuration it has received. The configuration module 6 then has a server address space 8 that comprises virtual address spaces 9 for all subscribers for which the configuration module 6 is responsible.

In other words, the configuration module 6 takes the received identification/configuration messages of the subscribers 2, 3 as a basis for setting up its information model in the address space in order to represent the subscriber(s) there as appropriate. The respective virtual address space 9 preferably comprises the variable budget of the respective subscriber 2, 3 (e.g., Published DataSet).

FIG. 1 schematically indicates the server address space 8 and, therein, by way of illustration, the virtual address spaces 9 for the two IO devices 2 and the controller 3 within the configuration module 6. Here, " . . . " is also used to indicate that there is, or may be, provision for more virtual address spaces 9 for more subscribers 2, 3.

Next, a user 10 can perform a configuration for the respective subscriber 2, 3 in the virtual address space 9 of the subscriber as usual via method calls and/or can change a configuration that already exists for the respective subscriber 2, 3 as usual via method calls, such as via an OPC UA client and, for example, using the Utthunga PubSub configuration tool, which may be installed on a PC 11.

For this, the configuration module 6 can have an OPC UA server in a manner known per se, and the already known request/response method can preferably be used.

It should be noted FIG. 1 uses arrows with a dashed line to indicate the method calls and arrows with a dash-dot line to indicate the PubSub communication/the data flow relating to the configuration info.

If a configuration for a subscriber 2, 3 is provided, or changed (e.g., a new WriterGroup is produced), in a virtual name space 9, the configuration module 6 converts the configuration and/or configuration change into a PubSub message, in the present case a PubSub Event message. In the exemplary illustrated embodiment, the configuration, or configuration change, is converted via a PubSub unit 7 of the configuration module 6.

The PubSub Event message is subsequently transmitted to the, or the respective, subscriber 2, 3. To this end, the PubSub Event message is sent from the configuration module 6 to the first publishing group. The PubSub Event message expediently also includes in the payload data the addressing of the affected device 2, 3. The PubSub Event message may further comprise at least one command.

The, or the respective, subscriber 2, 3 then configures itself according to the PubSub Event message. This can be achieved, for example, simply by virtue of it storing the received PubSub Event message, or at least portions thereof. There is preferably provision for the, or the respective, subscriber 2, 3 to know how it needs to react to at least one included command, for example by storage.

Furthermore, the respective subscriber 2, 3 expediently acknowledges receipt of the transmitted PubSub Event message. The acknowledgement can be provided e.g. by virtue of the respective subscriber 2, 3 publishing the performed configuration in the second publishing group. In particular, the acknowledgement can be provided according to Standard Part 14 by publishing the present config as DataSet metadata.

It will be noted that the sequence described above by way of illustration for the IO devices 2 and the controller 3 as subscribers can equally take place for any further components, both further IO devices 2 and controllers 3 and components of another type.

Following the configuration performed in accordance with disclosed embodiments of the invention, the machine-to-machine communication can particularly occur using OPC UA PubSub, while the process data interchange between the IO devices 2 and the controller 3 can preferably occur as previously using Profinet/Profinet TSN. OPC UA PubSub is therefore a suitable addition to the fieldbus Profinet (TSN).

With the procedure described, it is no longer absolutely essential for the subscriber(s) 2, 3 to have an OPC UA address space 13 provided on them locally and to support OPC UA client/server functionality 14, as is the case with the automation systems 1 already known from the prior art. Such an automation system is shown for comparison by way of illustration and purely schematically in FIG. 2. Analogously to FIG. 1, two IO devices 2 and one controller 3 are shown from the components by way of illustration.

On the basis of the procedure in accordance with disclosed embodiments of the invention, it is possible to dispense with the use of TCP in the network stack of the subscribers 2, 3, because OPC UA PubSub is, or can be, transmitted, e.g., via User datagram protocol (UDP), Ethernet, Time-Sensitive Networking (TSN) or, in future, 5G. The resource requirement (for example, flash and RAM) of the subscribers 2, 3 can be significantly reduced as a result. The subscribers 2, 3 can become significantly less expensive. The procedure in accordance with disclosed embodiments of the invention is quite particularly advantageous for components that are normally required in greater numbers, such as field devices, for example, in the form of IO devices 2.

Figure 3:
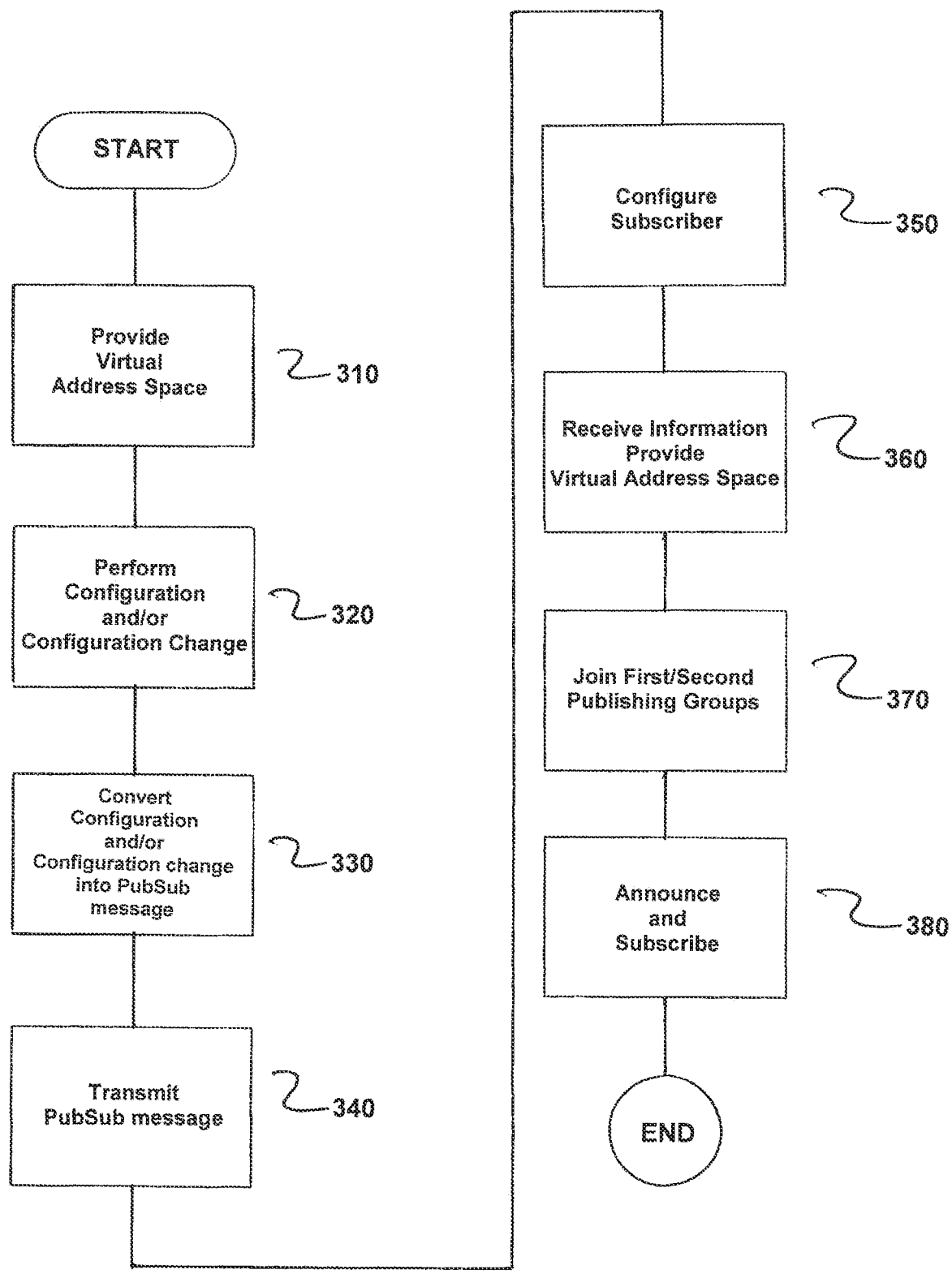
FIG. 3 is a flowchart of the method in accordance with the invention.

FIG. 3 is a flowchart of the method for configuring at least one Open Platform Communications Unified Architecture (OPC UA) Publish/Subscribe (PubSub) subscriber 2, 3 in an industrial network 4.

The method comprise a) providing a virtual address space 9 for the at least one subscriber 2, 3 on a configuration module 6 which is separate from the at least one subscriber 2, 3, as indicated in step 310.

Next, b) performing a configuration for the at least one subscriber 2, 3 in the virtual address space 9 of the at least one subscriber 2, 3 is performed and/or a change of a configuration which already exists for the at least one subscriber 2, 3 is changed, as indicated in step 320.

Next, c) the configuration module 6 converts either the configuration and/or configuration change into at least one PubSub message, as indicated in step 330.

Next, d) the at least one PubSub message is transmitted to the at least one subscriber 2, 3, as indicated in step 340.

Next, e) the at least one subscriber 2, 3 is configured according to the at least one PubSub message, as indicated in step 350.

The method additionally comprises receiving, by the configuration module 6, from the at least one subscriber 2, 3, the identification thereof and a present configuration thereof as a PubSub message and, in reaction thereto, providing a virtual address space 9 for the at least one subscriber in step 310, as indicated in step 360.

Next, the configuration module 6 joins a first publishing group, for which the configuration module 6 is a publisher, and to which the at least one subscriber 2, 3 subscribes, and join a second publishing group, in which the configuration module 6 participates as a subscriber, as indicated in step 370.

Next, the configuration module 6 announces the second publishing group in the first publishing group, and subscribes to the second publishing group, as indicated in step 380. In accordance with the invention, the at least one subscriber 2, 3 send its identification and its present configuration to the second publishing group as a PubSub message.

The invention claimed is:

1. A method for configuring at least one Open Platform Communications Unified Architecture Publish/Subscribe subscriber in an industrial network, the method comprising:
   a) providing a virtual address space for the at least one subscriber on a configuration module which is separate from the at least one subscriber;
   b) performing a configuration for the at least one subscriber in the virtual address space of the at least one subscriber and/or changing a configuration which already exists for the at least one subscriber;
   c) converting, by the configuration module, at least one of (i) the configuration and (ii) configuration change into at least one PubSub message;
   d) transmitting the at least one PubSub message to the at least one subscriber,
   e) configuring the at least one subscriber according to the at least one PubSub message, the method further comprising:
      receiving, by the configuration module, receives from the at least one subscriber, the identification thereof and a present configuration thereof as a PubSub message and, in reaction thereto, providing a virtual address space for the at least one subscriber in step a),
      joining, by the configuration module, a first publishing group, for which the configuration module is a publisher, and to which the at least one subscriber subscribes, and joining by the configuration module a second publishing group, in which the configuration module participates as a subscriber; and
      announcing, by the configuration module, the second publishing group in the first publishing group, and subscribing, by the at least one subscriber, to the second publishing group, the at least one subscriber sending its identification and its present configuration to the second publishing group as a PubSub message.

2. The method as claimed in claim 1, wherein at least one of (i) during step a) the virtual address space for the at least one subscriber is provided in an address space of the configuration module and (ii) during step b) the configuration in the virtual address space of the at least one subscriber is at least one of performed and changed via method calls.

3. The method as claimed in claim 1, wherein the configuration module sends the at least one PubSub message into which the configuration module has converted at least one of the configuration and configuration change to the first publishing group during step d).

4. The method as claimed in claim 2, wherein the configuration module sends the at least one PubSub message into which the configuration module has converted at least one of the configuration and configuration change to the first publishing group during step d).

5. The method as claimed in claim 1, wherein the configuration module converts at least one of the configuration and configuration change into at least one PubSub Event message during step c).

6. The method as claimed in claim 1, wherein the PubSub message into which the configuration module converts at least one of the configuration and configuration change during step d) also comprises an addressing of the at least one subscriber.

7. The method as claimed in claim 1, wherein the at least one subscriber acknowledges receipt of the at least one PubSub message transmitted during step d).

8. The method as claimed in claim 1, wherein an acknowledgement is provided by virtue of the at least one subscriber publishing the configuration performed during step d) in the second publishing group.

9. The method as claimed in claim 1, wherein the at least one subscriber or at least one of the subscribers is a field device.

10. The method as claimed in claim 9, wherein field device comprises an TO device.

11. The method as claimed in claim 1, wherein the at least one subscriber forms part of an industrial automation system.

12. The method as claimed in one of the preceding claim 1, wherein the configuration module is afforded by an OPC UA Discovery Server or forms part of the an OPC UA Discovery Server, the OPC UA Discovery Server being extended by a publisher and subscriber functionality and a server address space of the OPC UA Discovery Server, and the virtual address space being provided for the at least one subscriber during step a) being mapped in the server address space.

13. An automation system, comprising:
at least one field device which forms at least one subscriber; and
a configuration module which is separate from the at least one field device;
wherein a virtual address space is provided or providable for the at least one field device in the configuration module;
wherein the configuration module being configured such that, if at least one of (i) a configuration for the at least one field device is performed for the at least one field device in the or a virtual address space and (ii) a configuration which exists for the at least one field device is changed, then said configuration module converts at least one of the configuration and configuration change into at least one PubSub message and transmits the at least one PubSub message to the at least one field device;
wherein the at least one field device is configured to configure itself according to the at least one PubSub message;
wherein the configuration module is further configured to receives, from the at least one subscriber, the identification thereof and the present configuration thereof as a PubSub message and, in reaction thereto, to provide the virtual address space for the at least one subscriber,
wherein the configuration module is further configured to join a first publishing group, for which said configuration module is a publisher, and to join a second publishing group, in which said configuration module participates as a subscriber; and
wherein the configuration module is further configured to announces the second publishing group in the first publishing group.

14. A computer program comprising program code instruction which, when executed by a processor of at least one computer, cause the at least one computer to perform the steps of the method of claim 2.

15. A non-transitory computer-readable medium comprising program instructions which, when executed by a processor of at least one computer, cause the at least one computer to configure at least one Open Platform Communications Unified Architecture (OPC UA) Publish/Subscribe (PubSub) subscriber in an industrial network, the program instructions comprising:
a) program code for providing a virtual address space for the at least one subscriber on a configuration module which is separate from the at least one subscriber;
b) program code for performing a configuration for the at least one subscriber in the virtual address space of the at least one subscriber and/or for changing a configuration which already exists for the at least one subscriber;
c) program code for converting, by the configuration module, at least one of (i) the configuration and (ii) configuration change into at least one PubSub message;
d) program code for transmitting the at least one PubSub message to the at least one subscriber,
e) program code for configuring the at least one subscriber according to the at least one PubSub message, the program instructions further comprising:
program code for receiving, by the configuration module, receives from the at least one subscriber, the identification thereof and a present configuration thereof as a PubSub message and, in reaction thereto, for providing a virtual address space for the at least one subscriber in a),
program code for joining, by the configuration module, a first publishing group, for which the configuration module is a publisher, and to which the at least one subscriber subscribes, and for joining by the configuration module a second publishing group, in which the configuration module participates as a subscriber; and
program code for announcing, by the configuration module, the second publishing group in the first publishing group, and for subscribing, by the at least one subscriber, to the second publishing group, the at least one subscriber sending its identification and its present configuration to the second publishing group as a PubSub message.

* * * * *